United States Patent Office 3,347,055
Patented Oct. 17, 1967

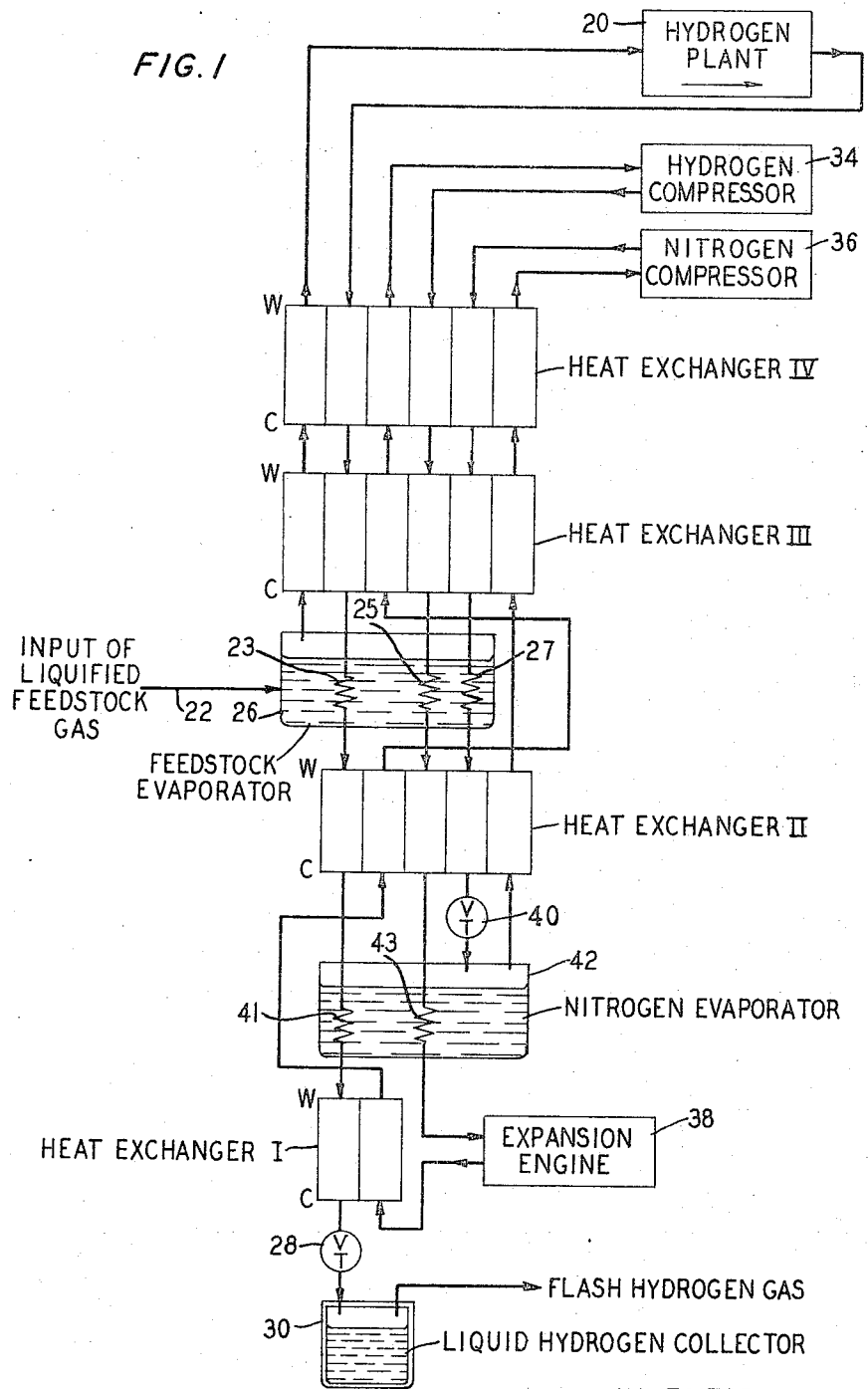

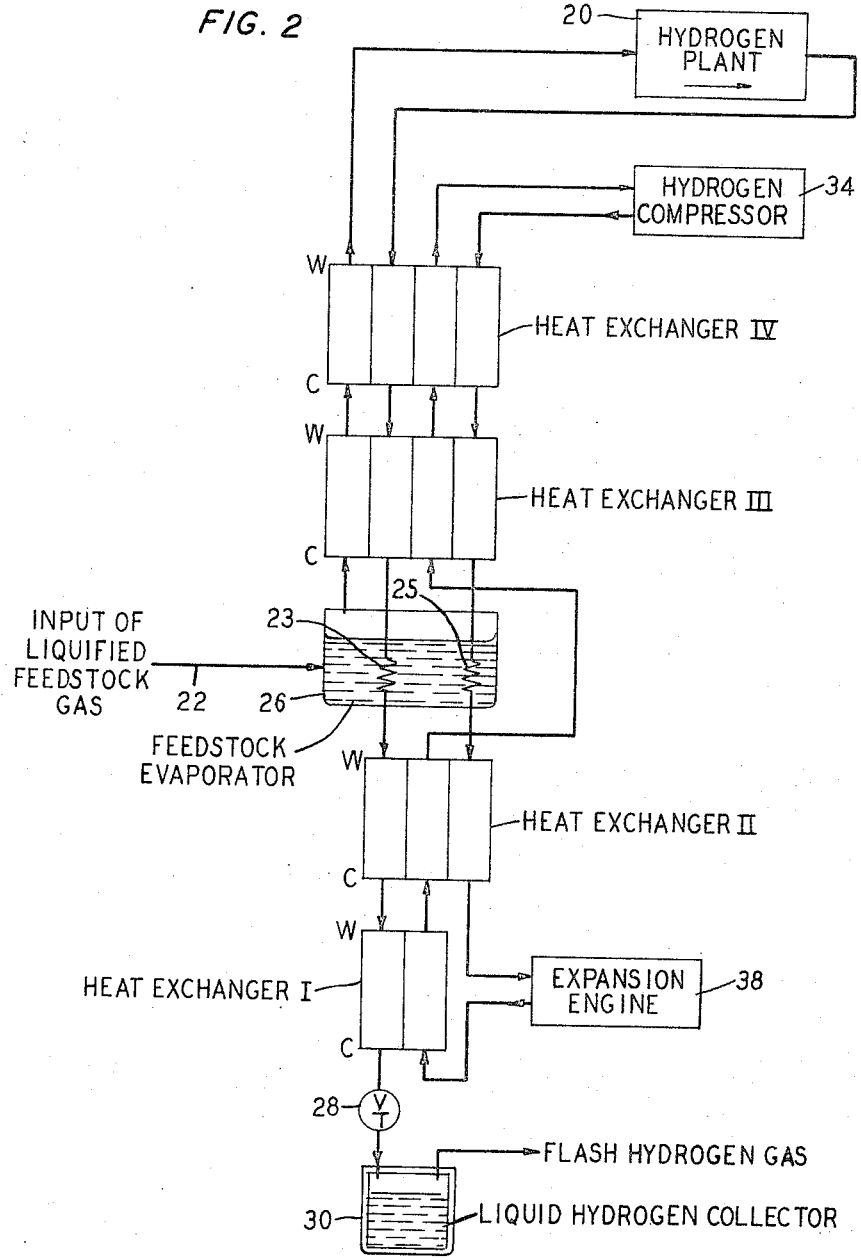

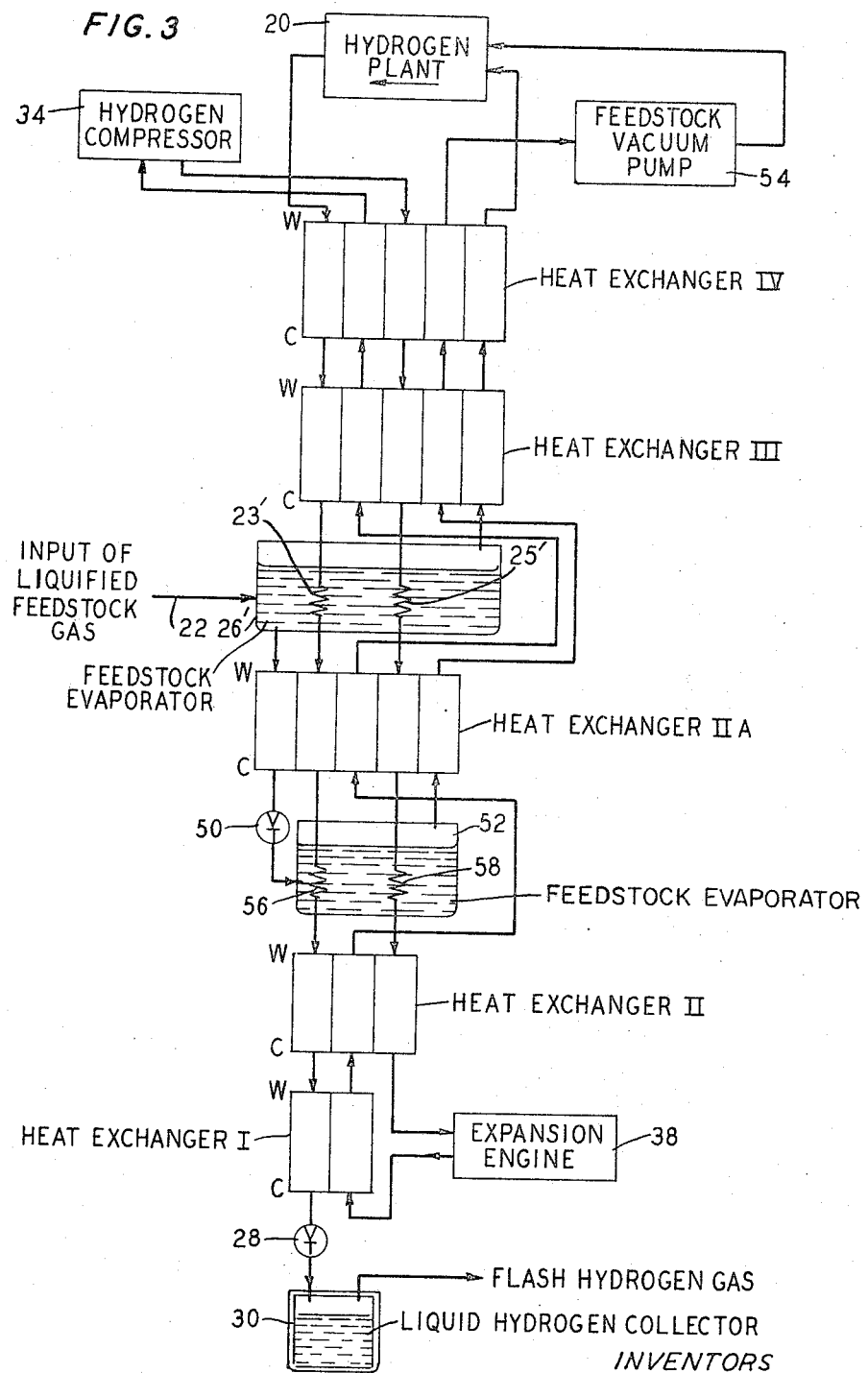

3,347,055
METHOD FOR RECUPERATING REFRIGERATION
Edward R. Blanchard, Summit, and Donald L. Smith, Berkeley Heights, N.J., assignors to Air Reduction Company, Incorporated, New York, N.Y., a corporation of New York
Filed Mar. 26, 1965, Ser. No. 442,917
8 Claims. (Cl. 62—9)

ABSTRACT OF THE DISCLOSURE

Liquefied gas feedstock such as methane is vaporized, warmed to ambient temperature and subjected to a known process to yield a product stream of hydrogen gas. Refrigeration contained in the feedstock is used to cool said hydrogen gas product stream to the temperature of the feedstock, the latter being vaporized by heat from the product stream and from compressed cycle nitrogen and hydrogen. In the nitrogen cycle, vaporized liquid nitrogen further cools the product stream. Engine expanded cycle hydrogen then cools the product stream to saturation, and the stream is liquefied by throttling and collecting in a Dewar.

---

This invention relates to means and methods for recuperating refrigeration in cryogenic plants and processes and more particularly to effecting recuperation of refrigeration in the manufacture of a cryogenic liquid product such as liquid hydrogen from a substance which contains hydrogen.

An object of the invention is to reduce the cost of producing a cryogenic liquid product from a liquefied feedstock by recuperating the refrigeration available in the feedstock for use in the process of producing the liquid product.

More specifically, an object is to reduce the cost of producing liquid hydrogen from a liquefied feedstock gas by recuperating the refrigeration in the liquefied feedstock gas for use in the process of liquefying the hydrogen gas produced from the feedstock.

A specific object is to use feedstock liquefied methane, liquefied petroleum gas, liquefied petroleum pipeline gas, liquefied natural gas, or the like, as a precoolant in a process for producing liquid hydrogen from such feedstock materials.

An advantage of the invention is a reduction both in operating cost and in capital expenditure in plant for a liquid hydrogen producing plant.

Another advantage is the elimination of the need for a nitrogen expansion engine, or in some cases of an entire nitrogen refrigeration system, usually required in prior art systems of the kind contemplated herein.

The term "cryogenic" refers to the quality of temperature substantially below ambient, usually below about $-100°$ F.

In the manufacture of liquefied gas products of cryogenic temperatures, such as hydrogen, it is highly advantageous to use a cryogenic liquid feedstock such as, in the case of hydrogen manufacture, commercially available materials such as methane, petroleum gas, petroleum pipeline gas, natural gas, and the like, in the form of liquefied gas obtainable from suppliers. We have found that the refrigeration contained in the liquefied gas feedstock is sufficient to provide an important part of the refrigeration needed to liquefy the product. Accordingly, we transfer refrigeration from the feedstock liquefied gas to the product, thereby reducing materially the refrigeration required from other sources. Furthermore, we have found that liquefied natural gas used as feedstock and liquid hydrogen product therefrom are in such heat balance as to materially increase the advantage of utilizing the refrigeration value of the natural gas to cool the product.

Other features, objects and advantages will appear from the following more detailed description of an illustrative embodiment of the invention, which will now be given in conjunction with the accompanying drawings.

In the drawings:

FIGURE 1 is a schematic diagram or flow sheet for an embodiment of the invention in which the refrigeration derived from liquefied feedstock is used to supplement refrigeration from closed circuits of hydrogen and nitrogen respectively;

FIGURE 2 is a schematic diagram or flow sheet for another embodiment in which the closed nitrogen circuit is eliminated; and FIGURE 3 is a schematic diagram or flow sheet for an embodiment which is a modification of the embodiment shown in FIGURE 2 arranged to effect certain economies over the system of FIGURE 2.

Referring to FIGURE 1, there is represented diagrammatically in block 20 that portion of a liquid hydrogen plant in which gaseous hydrogen is produced from a gaseous feedstock containing hydrogen in chemical combination with other elements. The input to the plant represented by block 20 may for example be methane or petroleum gas, such as petroleum pipeline gas, natural gas, etc. In accordance with the invention, liquefied feedstock gas of any of the abovementioned types is supplied through an inlet conduit 22 and is evaporated and used for precooling of the gaseous hydrogen product before being fed to the portion 20 of the plant. The liquefied feedstock gas is evaporated in an evaporator 26. After precooling, the gaseous hydrogen product is liquefied and is collected in a storage vessel or Dewar 30. For brevity herein, the portion 20 of the plant will be referred to simply as the plant 20.

The liquefied feedstock gas is evaporated in the evaporator 26 by means of heat supplied by warm gases contained in boiler coils 23, 25, 27, immersed in a bath of the liquefied feedstock in the evaporator. The gas from the evaporator 26 is introduced into the cold end of a Heat Exchanger III through one of a number of separate passages therethrough to the warm end of Heat Exchanger III and thence to the cold end of a Heat Exchanger IV into a passage therein. Heat Exchangers I and II are also provided and will be referred to below. The Heat Exchangers I through IV are all of the countercurrent indirect type. In each exchanger, the warm and cold ends are labeled W and C respectively, and in each case the warm end is shown at the top and the cold end at the bottom. From the warm end of the Heat Exchanger IV, the feedstock gas is conveyed to the plant 20. The process stream of hydrogen gas produced by the plant 20 is introduced under pressure into the warm end of Heat Exchanger IV in a passage thereof and passes thence out of the cold end of Heat Exchanger IV into Heat Exchanger III and thence through the boiler coil 23, Heat Exchanger II, a boiler coil 41 in a nitrogen evaporator 42, and Heat Exchanger I, becoming progressively colder, until it is liquefied by expanding it through a throttle valve 28 into the storage tank or Dewar 30. The device 30 is provided with the usual venting means from which flash hydrogen gas may be discharged to the atmosphere, and provision may be made if desired for recuperating residual refrigeration from the flash gas before venting to waste.

Additional refrigeration required to accomplish the liquefication of the gaseous hydrogen product of the plant 20 may be supplied as shown in FIGURE 1 by means of a closed hydrogen circuit powered by a hydrogen compressor 34, which will usually be arranged to be provided with make-up hydrogen gas from the main plant. The hydrogen circuit may be supplemented by a closed nitrogen circuit powered by a nitrogen compressor 36.

Refrigerant hydrogen gas from the compressor 34 is precooled by being fed from warm end to cold end respectively through Heat Exchangers IV, III, boiler coil 25, Heat Exchanger II and a boiler coil 43 in the nitrogen evaporator 42 in turn into an expansion engine 38 wherein the gas is work-expanded to a suitable low temperature and is then fed from cold end to warm end successively through Heat Exchangers I, II, III, and IV back to the compressor 34.

Refrigerant nitrogen gas from the compressor 36 is precooled by being fed from warm end to cold end successively through Heat Exchangers IV, III, boiler coil 27, and Heat Exchanger II, and is then expanded through a throttle valve 40 into the nitrogen evaporator 42 from which cold vapor is returned from cold end to warm end successively through Heat Exchangers II, III, and IV, back to the compressor 36.

In the arrangement shown in FIGURE 1, the cooling of the closed cycle nitrogen stream in the boiler coil 27 immersed in the liquid feedstock produces a refrigerating effect which is sufficient to permit dispensing with the nitrogen expansion engine which is customarily required in the nitrogen cycle in order to supply the necessary total refrigeration for the production of the liquid hydrogen. In addition, the nitrogen compressor can be of a smaller size and can operate at lower pressure than is customarily required in a plant which does not recuperate the refrigeration residing in the liquefied feedstock.

To propel the process hydrogen from the plant 20 to the throttle valve 28 with sufficient residual pressure at the inlet of the valve to provide the required expansion to liquefy the hydrogen, the process stream is pressurized as may be required, for example to about 30 atmospheres, at the inlet to Heat Exchanger IV. The evaporated feedstock gas enters the plant 20 at about atmospheric pressure. The cycle hydrogen, by way of illustration, may leave the compressor 34 at about 160 atmospheres and may return to the compressor at about 1.5 atmospheres. The nitrogen cycle, by way of illustration, may leave the compressor 36 at about 21 atmospheres and return to the compressor at about 1.35 atmospheres.

The process hydrogen stream, by way of illustration, may enter the warm end of Heat Exchanger IV at about 300° K. Illustrative temperature of the stream during the cooling process are 230° K. at the warm end of Heat Exchanger III, 117° K. at the warm end of Heat Exchanger II, 82° K. at the warm end of Heat Exchanger I, and 23° K. at the outlet of the throttle valve 28. Illustrative temperatures of the feedback gas are 112° K. at the cold end of Heat Exchanger III, 225° K. at the cold end of Heat Exchanger IV, and 295° K. at the warm end of Heat Exchanger IV. Illustrative temperatures of the closed cycle hydrogen are 22° K. at the outlet of the expansion engine 38, 74° K. at the cold end of Heat Exchanger II, 112° K. at the cold end of Heat Exchanger III, 225° K. at the cold end of Heat Exchanger IV, and 295° K. at the warm end of Heat Exchanger IV. Illustrative temperatures of the closed nitrogen cycle are approximately the same as for the closed hydrogen cycle at the cold ends of Heat Exchangers II, III, and IV, and at the warm end of Heat Exchanger IV, respectively.

FIGURE 2 shows a system generally similar to that of FIGURE 1, but differing in that the closed nitrogen circuit is omitted. To bring the total amount of refrigeration up to that employed in the system of FIGURE 1, the hydrogen compressor 34 is driven harder. An illustrative value of gas flow through the hydrogen compressor 34 in FIGURE 1 is 2,950 standard cubic feet per unit time as compared with 4,400 standard cubic feet for the same unit time in the system of FIGURE 2. The increase in power required to obtain the increased flow of gas is more than offset by a reduction in capital outlay with the attendant saving in interest charges.

The components which appear both in FIGURE 1 and FIGURE 2 have been given identical reference characters in the two figures. The omission of the component parts involved in the closed nitrogen cycle will be evident from an inspection of the figures.

The process hydrogen stream leaving the cold end of Heat Exchanger II goes directly to the warm end of Heat Exchanger I and thence through Heat Exchanger I and throttle valve 28 into storage vessel 30.

Refrigerant hydrogen gas from the compressor 34 is precooled by being fed through Heat Exchanger IV and III, and thence through boiler coil 25 and Heat Exchanger II directly into the expansion engine 38. The expanded gas from the engine 38 passes through the heat exchangers back to the compressor 34 as shown in FIGURE 1.

The illustrative pressure values shown in FIGURE 2 are the same as shown in FIGURE 1 and the illustrative temperatures are the same with the exception of the warm end temperature of the process hydrogen stream in Heat Exchanger II which is shown as 115° K. in FIGURE 2, compared to 117° K. in FIGURE 1, and the cold end temperature of the cycle hydrogen in Heat Exchanger II is 57° K. in FIGURE 2, compared to 74° K. in FIGURE 1.

FIGURE 3 shows a variation of the arrangement of FIGURE 2 which incorporates certain features making for increased efficiency of operation. A portion of the input liquefied feedstock is separated from the rest and is vacuum-pumped to lower its boiling temperature, permitting a more efficient arrangement of the closed hydrogen cycle, as well as an increase in the amount of refrigeration taken up by the input liquefied feedstock. A power saving is effected as compared with the system shown in FIGURE 2, resulting in an over-all saving, even taking into account that an additional heat exchanger is required as well as a vacuum pump and an evaporator for the vacuum-pumped portion of the feedstock.

The components which appear both in FIGURE 3 and FIGURE 2 have been given identical reference characters in the two figures.

An evaporator 26' corresponds generally with the evaporator 26 but has a liquid outlet going to the warm end of a Heat Exchanger IIA and thence through a throttle valve 50 to a second evaporator 52, which latter evaporator is vacuum-pumped by means of a vacuum pump 54 on the way to the intake side of the plant 20. The vapor output of the evaporator 26' goes by way of the Heat Exchangers III and IV to the intake side of the plant 20 as in the systems shown in FIGURES 1 and 2.

The process hydrogen stream from the plant 20 passes through Heat Exchangers IV and III into a boiler coil 23' immersed in the bath of liquid feedstock in the evaporator 26' and thence through the Heat Exchanger IIA and a boiler coil 56 immersed in the bath of liquid feedstock in evaporator 52 to Heat Exchangers II and I, and via throttle valve 28 to vessel 30.

The closed cycle hydrogen from the compressor 34 passes through Heat Exchangers IV and III into a boiler coil 25' in the evaporator 26' and thence through the Heat Exchangers IIA and a boiler coil 58 in the evaporator 52 to Heat Exchanger II and expansion engine 38. The expanded gas from the engine 38 passes through the Heat Exchangers I, II, IIA, III, and IV, in that order back to the compressor 34.

As stated earlier in this disclosure, liquefied natural gas used as feedstock and liquid hydrogen product therefrom are in such heat balance as to materially increase the advantage of utilizing the refrigeration value of the natural gas to cool the product.

In the production of hydrogen from a natural gas having approximately the following composition:

94.5% CH$_4$, methane
3.6% C$_2$H$_6$, ethane
1.4% C$_3$H$_8$, propane the use ratio is .528 cubic feet of natural gas per cubic foot of hydrogen product. By weight this is approximately 4.2 tons of natural gas per ton of hydrogen.

The process of FIGURE 1, for example, can efficiently use the refrigeration available in approximately 4.1 tons of natural gas per ton of liquid hydrogen product. In other words, 97.5% of the refrigeration available in the liquefied natural gas feedstock can be efficiently applied in the hydrogen liquefaction process.

While illustrative forms of apparatus and methods in accordance with the invention have been described and shown herein, it will be understood that numerous changes may be made without departing from the general principles and scope of the invention as defined by the claims that follow.

We claim:

1. The method of producing a desired hydrogen liquid product from a liquid feedstock comprising the steps of (a) evaporating liquid feedstock with heat supplied by the product in the form of a gaseous stream before liquefication thereof, and with heat supplied by a closed cycle hydrogen gas auxiliary refrigeration system independent of said gaseous product stream; (b) precooling said gaseous product stream and auxiliary hydrogen gas refrigerant from said closed cycle system to a temperature suitably close to the boiling point of the feedstock to efficiently transfer heat to said feedstock, said precooling being effected by countercurrent heat exchange with evaporated feedstock and with work-expanded auxiliary hydrogen gas refrigerant; (c) further cooling said gaseous product stream and said precooled auxiliary hydrogen gas refrigerant by heat exchange with work-expanded auxiliary hydrogen gas refrigerant at a lower temperature than prevailing in step (b); (d) work-expanding auxiliary hydrogen gas refrigerant cooled in step (c); and (e) liquefying said gaseous product stream following cooling thereof in steps (b), (a), and (c) in that order to form said hydrogen liquid product.

2. The method of producing a hydrogen liquid product from a liquid feedstock comprising the steps of (a) evaporating liquid feedstock with heat supplied by combined heat transfer from the product in the form of a gaseous stream before liquefication thereof, a closed cycle hydrogen gas auxiliary refrigeration system independent of said gaseous product stream and a closed cycle nitrogen auxiliary refrigeration system; (b) precooling said gaseous product stream, auxiliary hydrogen gas refrigerant and auxiliary nitrogen gas refrigerant from said respective closed cycle systems to a temperature suitably close to the boiling point of the feedstock to efficiently transfer heat to the feedstock, said precooling being effected by countercurrent heat exchange with evaporated feedstock, with work-expanded hydrogen auxiliary gas refrigerant and with evaporated liquid nitrogen; (c) further cooling said gaseous product stream, said auxiliary hydrogen gas refrigerant and said auxiliary nitrogen gas refrigerant by combined heat exchange with work-expanded auxiliary hydrogen gas refrigerant and with evaporated liquid nitrogen close to the boiling point of the nitrogen; (d) liquefying the thus cooled auxiliary nitrogen gas refrigerant; (e) subjecting the thus cooled gaseous product stream and the thus cooled auxiliary hydrogen gas refrigerant to the cooling effect of liquid nitrogen; (f) work-expanding the thus cooled auxiliary hydrogen gas refrigerant; and (g) liquefying said gaseous product stream following cooling thereof in the preceding recited steps.

3. The method of producing a hydrogen liquid product from a cryogenic liquid feedstock comprising the steps of evaporating a portion of the liquid feedstock at substantially atmospheric pressure in a first evaporating vessel; evaporating another portion of the liquid feedstock at a materially reduced pressure in a second evaporating vessel; conducting said evaporated portions to a main process wherein a gaseous stream of the desired product is formed; precooling said gaseous product stream by countercurrent heat exchange with evaporated feedstock effluent from said first evaporating vessel; using the thus precooled gaseous product stream to supply heat to the bath of liquid feedstock in said first evaporating vessel; further cooling said gaseous product stream by countercurrent heat exchange with evaporated feedstock effluent from said second evaporating vessel; using the thus cooled gaseous product stream to supply heat to the bath of liquid feedstock in said second evaporating vessel; liquefying the said gaseous product stream after heat transfer therefrom to the bath of liquid feedstock in said second evaporating vessel.

4. The method according to claim 3, together with the step of maintaining said reduced pressure in said second evaporating vessel by pumping evaporated feedstock out of said second evaporating vessel and delivering the same to the main process along with evaporated feedstock from said first evaporating vessel.

5. The method of producing a cryogenic liquid product from a cryogenic liquid feedstock containing the desired chemical constituents, which method comprises the steps of (a) evaporating a portion of the liquid feedstock at substantially atmospheric pressure in a first evaporating vessel; (b) evaporating another portion of the liquid feedstock at a materially reduced pressure in a second evaporating vessel; (c) precooling the liquid product, said liquid product being in the form of a gaseous product stream before liquefication thereof, together with precooling a closed cycle hydrogen gas by countercurrent heat exchange with work-expanded closed cycle hydrogen gas and with evaporated feedstock effluent from said first and said second evaporating vessels; (d) using the thus precooled gaseous product stream together with the said precooled closed cycle hydrogen gas to supply heat to the bath of liquid feedstock in said first evaporating vessel; (e) further cooling both said gaseous product stream and said closed cycle hydrogen gas by countercurrent heat exchange with evaporated feedstock effluent from said second evaporating vessel and with work-expanded closed cycle hydrogen gas at a lower temperature than used in step (c); (f) using the thus cooled gaseous product stream together with the thus cooled closed cycle hydrogen gas to supply heat to the bath of liquid feedstock in said second evaporating vessel; (g) work-expanding closed cycle hydrogen gas cooled in step (f); (h) further cooling said gaseous product stream by countercurrent heat exchange with the freshly expanded closed cycle hydrogen gas; and (i) liquefying the said gaseous product stream so cooled.

6. The method according to claim 5, together with the step of maintaining said reduced pressure in said second evaporating vessel by pumping evaporated feedstock out of said second evaporating vessel and delivering the same to a main process hydrogen plant along with evaporated feedstock from said first evaporating vessel.

7. The method of producing a cryogenic liquid product from a cryogenic liquid feedstock containing the desired chemical constituents, which method comprises the steps of (a) evaporating said feedstock by means of heat supplied by warm gases to a bath of the feedstock in an evaporating vessel; (b) passing said evaporated feedstock through a main process which forms therefrom the desired product in the form of a gaseous product stream; (c) compressing a gaseous hydrogen stream that is at all times kept unmixed with said desired gaseous product stream; (d) work-expanding the compressed hydrogen stream to provide refrigeration in addition to the refrigeration contained in said feedstock; (e) cooling said gaseous product stream and said compressed hydrogen stream by countercurrent heat exchange with said evaporated feedstock on the way to said main process and with work-expanded hydrogen on the way to be compressed; thereby cooling said gaseous product stream and said compressed hydrogen to temperatures suitably close to the boiling point of the feedstock to efficiently transfer heat thereto; (f) using said gaseous product stream and said compressed hydrogen at said temperatures as warm gases to evaporate said feedstock as aforesaid, thereby further cooling said gaseous product stream and said compressed hydrogen; (g) further cooling said gaseous product stream and said compressed hydrogen by countercurrent heat exchange with said work-expanded hydrogen immediately following said work expansion; and (h) liquefying the said gaseous product stream so cooled.

8. The method in acordance with claim 7, together with the step of supplying additional refrigeration to the gaseous product stream by evaporating liquid nitrogen and placing the evaporated nitrogen in countercurrent heat exchange with said gaseous product stream.

References Cited

UNITED STATES PATENTS

| | | | |
|---|---|---|---|
| 2,704,274 | 3/1955 | Allison. | |
| 2,983,585 | 5/1961 | Smith | 62—23 X |
| 3,237,416 | 3/1966 | Seddon | 62—9 |
| 3,271,965 | 9/1966 | Maher et al. | 62—23 |

FOREIGN PATENTS 251,584   10/1912   Germany.

NORMAN YUDKOFF, *Primary Examiner.*

V. W. PRETKA, *Assistant Examiner.*